United States Patent
Kuiper et al.

(10) Patent No.: US 7,483,218 B2
(45) Date of Patent: Jan. 27, 2009

(54) OPTICAL COMPONENT FOR INTRODUCING OPTICAL ABERRATIONS TO A LIGHT BEAM

(75) Inventors: Stein Kuiper, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 136 days.

(21) Appl. No.: 10/598,247

(22) PCT Filed: Mar. 1, 2005

(86) PCT No.: PCT/IB2005/050742

§ 371 (c)(1), (2), (4) Date: Aug. 22, 2006

(87) PCT Pub. No.: WO2005/088610

PCT Pub. Date: Sep. 22, 2005

(65) Prior Publication Data
US 2007/0139748 A1    Jun. 21, 2007

(30) Foreign Application Priority Data
Mar. 4, 2004  (EP)  ................... 04100866

(51) Int. Cl.
*G02B 1/06* (2006.01)
(52) U.S. Cl. ...................... 359/666; 359/665
(58) Field of Classification Search .......... 359/665, 359/666
See application file for complete search history.

(56) References Cited

U.S. PATENT DOCUMENTS 4,011,009 A    3/1977 Lama et al.
(Continued)

FOREIGN PATENT DOCUMENTS

| EP | 1293807 A | 3/2003 |
|---|---|---|
| WO | WO03369380 A | 8/2003 |
| WO | WO2004051323 A | 6/2004 |

OTHER PUBLICATIONS

ISR, International Publication No. WO2005088610;Pub Date Sep. 22, 2005.

*Primary Examiner*—William C Choi
(74) *Attorney, Agent, or Firm*—Michael E. Belk (57) ABSTRACT

An optical component (48) for introducing optical aberrations to a light beam defining an optical axis (28) is described, comprising a fluid chamber (46) having a first fluid (56) and at least a second fluid (58) therein, the first and second fluid (56, 58) being non-miscible, the first fluid (56) and the second fluid (58) being in contact along an interface (60) extending through the fluid chamber (46) substantially transverse to the optical axis (28), the first and second fluids (56, 58) having different indices of refraction, the first fluid (56) being substantially electrically insulating and the second fluid (58) being substantially electrically conductive; at least a first electrode (62-70) separated from the second fluid (58) and at least a second electrode (72) acting on the second fluid to alter the shape of the interface (60) in dependence on a voltage applied between the first and second electrode (62-70, 72). The at least one first electrode (62-70) is arranged in an intermediate portion with respect to the interface (60) such that the intermediate portion (A, B) of the interface (60) is moved substantially in direction of the optical axis (28) in dependence on the voltage applied between the at least one first electrode (62-70) and the at least one second electrode (72).

7 Claims, 4 Drawing Sheets

U.S. PATENT DOCUMENTS

| | | |
|---|---|---|
| 6,369,954 B1 | 4/2002 | Berge et al. |
| 7,126,903 B2 * | 10/2006 | Feenstra et al. ........ 369/112.23 |
| 2002/0135908 A1 | 9/2002 | Ryutov et al. |
| 2002/0181367 A1 | 12/2002 | Ogasawara |
| 2003/0007445 A1 | 1/2003 | Hashimoto et al. |
| 2006/0087711 A1 * | 4/2006 | Tukker et al. ............... 359/198 |

* cited by examiner

FIG. 6 and # OPTICAL COMPONENT FOR INTRODUCING OPTICAL ABERRATIONS TO A LIGHT BEAM

The invention relates to an optical component for introducing optical aberrations to a light beam defining an optical axis, comprising a fluid chamber having a first fluid and at least a second fluid therein, the first and second fluids being non-miscible, the first fluid and the second fluid being in contact along an interface extending through the fluid chamber substantially transverse to the optical axis, the first and second fluids having different indices of refraction, the first fluid being substantially electrically insulating and the second fluid being substantially electrically conductive; at least a first electrode separated from the second fluid and at least a second electrode acting on the second fluid to alter the shape of the interface in dependence on a voltage applied between the first and second electrode.

Such an optical component is known from document WO 03/069380 A1.

An optical component mentioned at the outset is, for example, used in a scanning device for optical record carriers. Record carriers can be, for example, compact-disks (CD) or digital versatile disks (DVD).

In a scanning device for optical record carriers, a light beam, which is generated by a light source, for example a semi-conductor laser, is directed through an objective lens and focused onto the information layer of the record carrier through a transparent protection layer of the record carrier. The transparent protection layer through which the light beam must pass causes an optical aberration, in particular a spherical aberration in the light beam which deteriorates the quality of the focus of the light beam on the information layer of the record carrier. Another optical aberration caused by the transparent protection layer is a coma aberration, which is predominantly caused by a tilt of the record carrier with respect to the optical axis of the light beam or by a centering error of the record carrier.

Such optical aberrations have a negative influence on the output signals of the scanning device. Therefore, there is a need to compensate for optical aberrations in such scanning devices.

While spherical aberration can be compensated by a specific lens design of the objective lens, it is also possible and in some instances preferred if separate from the objective lens an additional optical component is arranged in the light beam path for compensating for the optical aberrations. In particular, since the optical aberrations can vary from one record carrier to another record carrier due to different thicknesses of the transparent protection layer or due to different tilts or centering errors of the record carriers with respect to the light beam, it is desired to have a variable compensation for such optical aberrations in order to be able to respond to variable or different kinds and/or different degrees or amounts of optical aberrations.

Document WO 03/069380 A1 mentioned above discloses a variable focus lens, which can introduce an optical aberration to the light beam in order to compensate for an optical aberration caused by, for example, the record carrier to be scanned. This variable focus lens comprises a first fluid and a second, non-miscible, fluid, which are in contact over a meniscus as the interface. A first electrode separated from the fluid bodies by a fluid contact layer and a second electrode in contact with the first fluid is provided to cause an electro-wetting effect whereby the shape of the meniscus can be altered by applying a voltage between the electrodes. The fluid contact layer has a substantially cylindrical inner wall. The first electrode of this known variable focus lens is a substantially cylindrical electrode encompassing the circumferential wall of the fluid chamber parallel to the optical axis. The second electrode is configured as a ring with a central aperture, which is, arranged perpendicular to the optical axis. This known variable focus lens relies on the effect that the wettability of a fluid on a wall can be altered by applying an electric field to the fluids in the fluid chamber.

In this known arrangement, the refractive interface between the first and second fluids can be made aspherical, thus providing for a spherical aberration correction. However, this known variable focus lens has the following drawback.

Since the known variable focus lens relies on the electro-wetting effect, the electrodes influence the angle of the meniscus at the circumferential wall, but there is only a limited influence on the central meniscus shape so that only a limited number of different aspherical surfaces can be obtained in the refractive interface between the two fluids, thereby limiting the ability of compensating for a large number of different kinds and degrees of optical aberrations in the light beam.

Other optical components which are capable of producing wave front aberrations are based on liquid crystal cells, which, for example, are disclosed in document US 2003/0007445 A1 or in US 2002/0181367 A1.

Such liquid crystal cells have, however, the drawback to be expensive to make because of a plurality of alignment layers involved, making these liquid crystal cells not a cost-effective solution for introducing and thus compensating for optical aberrations in a light beam. Furthermore, the switching time of these liquid crystal cells is of the order of a few milliseconds, which does not allow fast switching or tuning.

Therefore, it is an object of the present invention to improve an optical component as mentioned at the outset in order to achieve more freedom in surface shape while allowing fast switching speeds and incurring only low manufacturing costs.

This object is achieved with respect to the optical component mentioned at the outset in that the at least one first electrode is arranged in an intermediate portion with respect to the interface such that the intermediate portion of the interface between the circumferential wall is moved substantially in direction of the optical axis in dependence on said voltage applied between the at least one first electrode and the at least one second electrode.

The concept of the optical component according to the invention is based on the insight that it is possible to pull a contacting liquid, i.e. the second fluid towards electrodes that are placed underneath the electrically insulating fluid layer, i.e. the first fluid. In the known electro-wetting devices, the shape of the interface is deformed by influencing the contact angle of the meniscus with the wall. In between the walls the interface cannot be influenced and takes the shape that belongs to a state of a minimum in surface free energy. In contrast, by virtue of the optical component according to the invention, the second, electrically conductive fluid is influenced by the at least one first electrode which is arranged such that the electric field generated between the first and second electrodes acts through the interface onto the second electrically conductive fluid in an intermediate portion between the circumferential wall of the fluid chamber and substantially perpendicular to the interface, and by applying a respective voltage between the at least one first electrode and the second electrode, the interface between the first and second fluid is moved substantially in direction of the optical axis towards the at least one first electrode or away from same. Thus, it is possible to influence the curvature of the interface or meniscus even in between the circumferential wall of the fluid chamber. In other words, the electrical field generated by the at least one first electrode and the at least one second electrode acts substantially perpendicular through the interface onto the second, electrically conductive fluid, thereby moving same substantially parallel to the optical axis.

The at least one first electrode is preferably arranged in a wall of the fluid chamber transverse to the optical axis, which represents a light entrance or light exit wall of the optical component. Thus, the at least one first electrode is arranged in the optical path of the light beam, but this does not result in a technical problem, because the at least one first electrode can be made of a transparent material, for example indium tin oxide which is a material already in use for making transparent electrodes.

In a preferred refinement of the invention, the at least one first electrode is configured as a thin plate having its plane arranged perpendicular to the optical axis.

Further, it is preferred, if a plurality of first electrodes electrically insulated from one another are arranged side by side in substantially one plane perpendicular to the optical axis. Thus, it is possible to adjust an interface shape having simultaneously concave and convex portions, for example.

In this connection, it is preferred, if the first electrodes are separately connected to a voltage supply such that different voltages can be applied between the at least one second electrode and one of the first electrodes.

Thus, it is possible to control each of the first electrodes separately from one another so that the number of possible interface or meniscus shapes is still enhanced.

Preferably, the several first electrodes can differ from another in size and/or shape, wherein, for example, the sizes and/or shapes of the single first electrodes can be chosen in dependence on the specific optical aberration to be introduced to the light beam. Thus, it is also possible to provide for optical aberration compensation in a non-rotational symmetric fashion with respect to the optical axis.

Further, it can be preferred, if the at least one electrode is configured in ring shape, and if a plurality of first electrodes are configured as rings arranged concentrically with respect to the optical axis, when it is desired to provide for aberration correction in a rotational symmetric fashion with respect to the optical axis.

By supplying the different rings arranged around the optical axis with different voltages, the desired shape of the refractive interface between the two fluids can be adjusted.

In another preferred refinement, the plurality of first electrodes comprises at least three first electrodes, two first electrodes of which are configured in elliptical or oval shape which are arranged parallel and in a distance from one another and which are encompassed by a third first electrode which fills the remaining portion between the circumferential wall.

Such configuration of the first electrodes is in particular suited for introducing a coma aberration to the light beam for compensating for coma aberrations.

The invention further relates to a scanning device for optical record carriers, which comprises an optical component of anyone of the afore-mentioned configurations.

Further features and advantages will be apparent from the following description and the accompanying drawings.

It is to be understood that the features mentioned above or to be described below are not only applicable in the combinations given, but also in other combinations or isolation without departing from the scope of the invention.

Preferred embodiments of the invention are described in the following with respect to the accompanying drawings. In the drawings.

Figure 1:
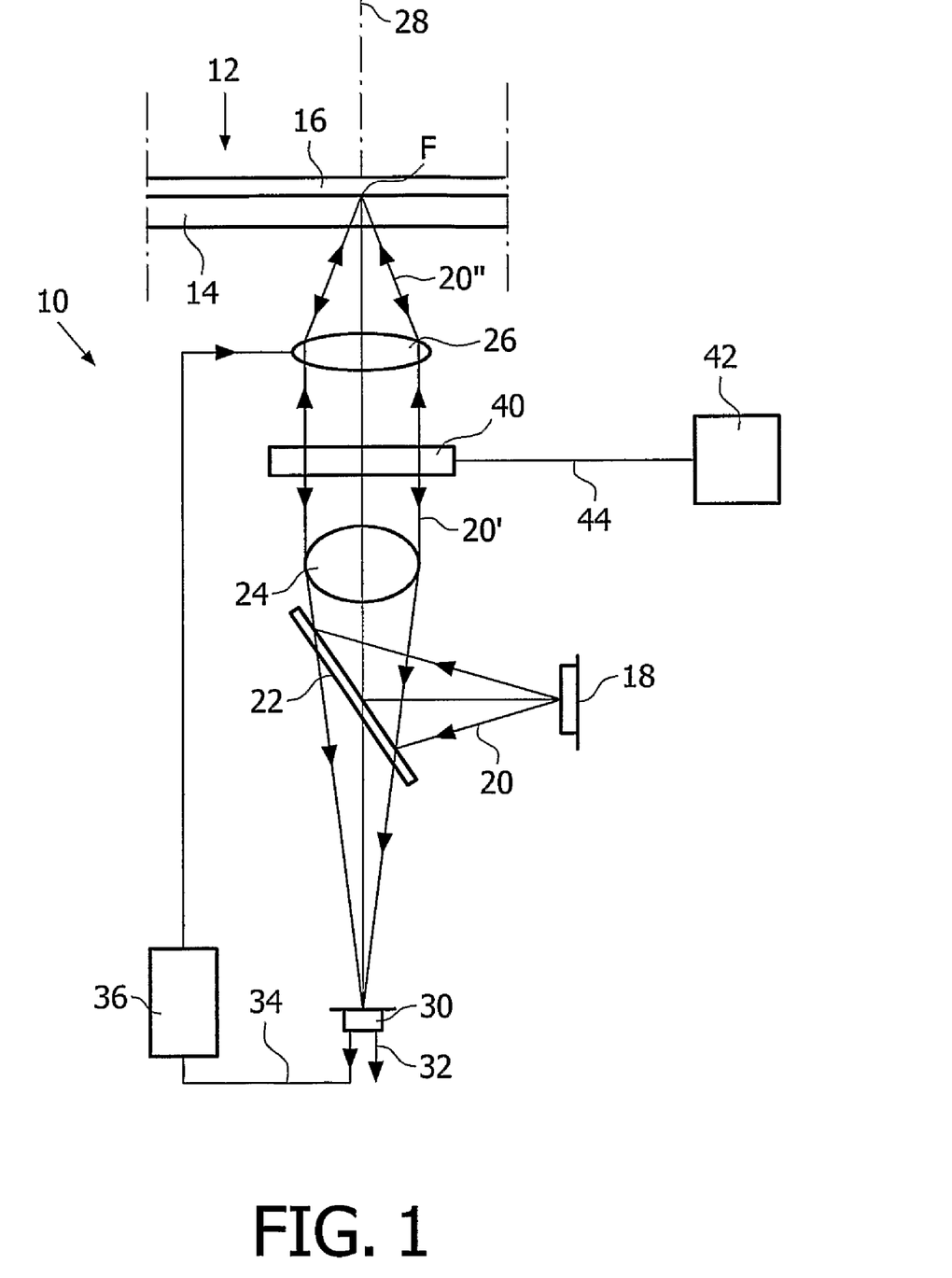
FIG. 1 shows a scanning device for record carriers in a schematic illustration, which comprises an optical component for introducing optical aberrations to a light beam.

FIG. 1 shows a scanning device 10 for scanning an optical record carrier 12. The record carrier comprises a transparent layer 14, on one side of which an information layer 16 is arranged. The side of the information layer 16 facing away from the transparent layer 14 is protected from environmental influences by a protection layer (not shown). The transparent layer 14 acts as a substrate for the record carrier 12 by providing mechanical support for the information layer 16.

The record carrier 12 is, for example, a compact-disk (CD) or a digital versatile disk (DVD). Information may be stored in the record carrier 12 in the form of optically detectable marks arranged in substantially parallel, concentric or spiral tracks in the information layer 16 (not shown). The marks may be in any optically readable form, for example in the form of pits, areas with a reflection coefficient or a direction of magnetization different from their surroundings, or a combination of these forms.

The scanning device 10 comprises a light source 18, for example a semi-conductor laser, which emits a diverging light beam 20. A beam splitter 22, for example a semi-transparent plate, reflects the light beam 20 towards a collimator lens 24 forming a collimated beam 20', which is incident on an objective lens 26. The objective lens 26 transforms the light beam 20' to a converging beam 20", which passes through the transparent layer 14 and impinges on the information layer 16 of the record carrier 12.

While in the embodiment shown the collimator lens 24 and the objective lens 26 are shown as separate optical elements, they also can be combined in a single lens.

The collimator lens 24 and the objective lens 26 define an optical axis 28 of the light beam 20', 20".

The light beam 20" is reflected by the information layer 16 and returns on the same path of the light beam 20" to the beam splitter 22 where at least a part of the reflected light beam is transmitted towards a detection system 30. The detection system 30 captures the light and converts it into one or more electrical signals. One of these signals is an information signal 32, the value of which represents the information read from the information layer 16.

Another signal is a focus error signal 34, the value of which represents the axial difference in height between the focus F on the information layer 16 and the information layer 16. The focus error signal 34 is used as an input for a focus servo controller 36, which controls the axial position of the objective lens 26, thereby controlling the axial position of the focus F such that focus F substantially coincides with the plane of the information layer 16. Further, a center servo controller can be provided to laterally displace the objective lens 26 in order to respond to a centering error of the record carrier 12.

Further, an optical component 40 for introducing optical aberrations into the light beam 20', 20" is arranged in the path of the light beam 20', 20". In the present embodiment, the optical component 40 is arranged between the collimator lens 24 and the objective lens 26. The optical component 40 can, however, also be positioned behind the objective lens 26 seen in the direction of the light beam 20', 20", i.e. between the objective lens 26 and the optical record carrier 12.

The optical component 40 introduces optical aberrations like spherical aberration and/or coma aberration into the light beam 20', 20", in order to compensate for corresponding aberrations caused by the transparent layer 14, in particular in case of a tilt error or a centering error of the optical record carrier 12.

The optical component 40 has tunable aberration characteristics, which are controlled by a control system 42 connected to the optical component 40 via one or more electrical lines 44.

With respect to FIGS. 2 through 4, a first embodiment of the optical component 40 will be described hereinafter.

The optical component 40 comprises a fluid chamber 46 defining an optical axis, which is the optical axis 28 in FIG. 1. The fluid chamber 46 is housed by a tightly sealed container 48 having a circumferential wall 50, which is substantially cylindrical in shape. However, other shapes can be envisaged for the circumferential wall 50. The container 48 further comprises a bottom wall 52 and a top wall 54 which are transverse, in the present embodiment perpendicular with respect to the optical axis 28. In case that the circumferential wall 50 is cylindrical, the bottom wall 52 and the top wall 54 are circular in shape. The expressions "bottom wall" and "top wall" can also be used in inversed manner, i.e. the wall 52 can also be the "top wall" while the wall 54 then is the "bottom wall".

At least the bottom wall 52 and the top wall 54 are transparent so that the light beam 20' or the light beam 20" in FIG. 1 can pass through the bottom wall 52 and the top wall 54 of the container 48. The circumferential wall 50 can also be made of a transparent material, which, however, is not necessary, because the circumferential wall 50 is not used as entrance or exit face for the light beams 20', 20".

The fluid chamber 46 is filled with a first fluid 56 and a second fluid 58.

The first fluid 56 and the second fluid 58 are non-miscible with respect to one another. Further, the first fluid is substantially electrically insulating and the second fluid 58 is substantially electrically conductive.

The first fluid 56 and the second fluid 58 are in contact with one another along an interface 60 extending through the fluid chamber 46 substantially transverse to the optical axis 28.

The first fluid 56 may be a silicone oil or an alcane, referred to herein simply as "oil", while the second fluid 58 is water containing a salt solution, for example. The two fluids 56 and 58 are preferably arranged to have an equal density, so that the optical component 40 functions independently of orientation, i.e. without dependence on gravitational effects between the two fluids 56 and 58. This may be achieved by appropriate selection of the first fluid constituent. To this end, alcanes or silicone oils may be modified by addition of molecular constituents to increase the density to match that of the salt solution, for example.

The indices of refraction of the first fluid 56 and the second fluid 58 differ from another so that the interface 60 represents a refracting surface. Further, the thickness of the first fluid 56 may be in the range of about 10 µm to about 200 µm or several hundreds of µm.

The optical component 40 further comprises at least one first electrode, in the embodiment shown a plurality of first electrodes 62, 64, 66, 68, 70. The first electrodes 62-70 are configured as rings, which are arranged concentrically with respect to the optical axis 28.

The first electrodes 62-70 are made of an electrically conductive transparent material like indium tin oxide. The first electrodes 62-70 are embedded in the bottom wall 52 of the container 48, and, thus, are not in contact with the first fluid 56 or the second fluid 58. In other embodiments, the electrodes 62-70 can be deposited on the inner surface of wall 52 and separated from the first fluid by a separation layer like polyethertetrafluorethylene.

At least one second electrode, in the present embodiment one second electrode 72 is in contact with the second electrically conductive fluid 58. The second electrode 72 is, for example, immersed in the second fluid 58.

Each of the first electrodes 62-70 is connected to a voltage supply such that a voltage $V_1$ can be applied to electrode 62, a voltage $V_2$ to electrode 64, a voltage $V_3$ to electrode 66, a voltage $V_4$ to electrode 68 and a voltage $V_5$ to electrode 70, where $V_1$-$V_5$ differ from one another, but the voltages $V_1$-$V_5$ can also be the same for two or more of the electrodes 62-70.

Figure 2:
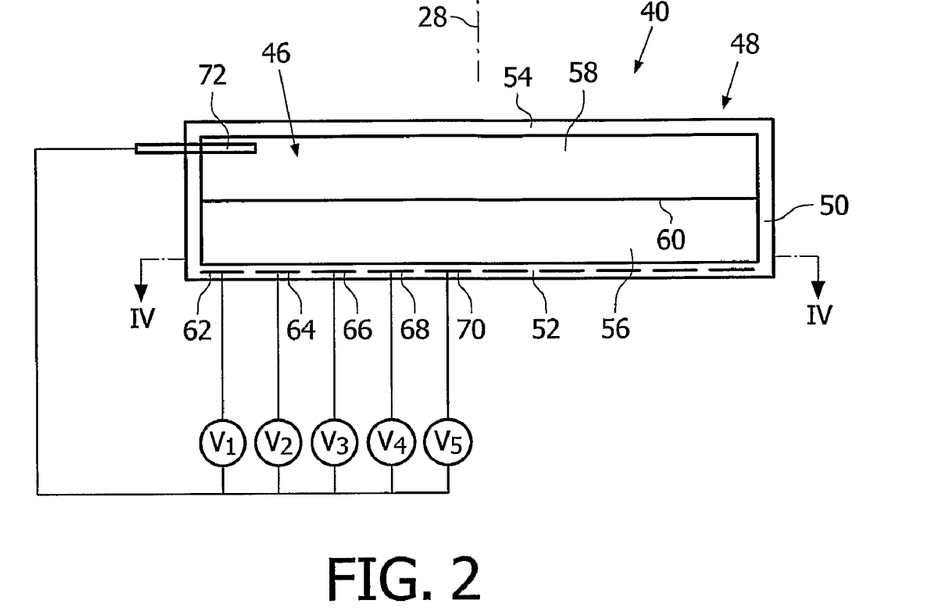
FIG. 2 is a cross-sectional enlarged side view of a first embodiment of an optical component for introducing optical aberrations to a light beam in a rest state.
Figure 3:
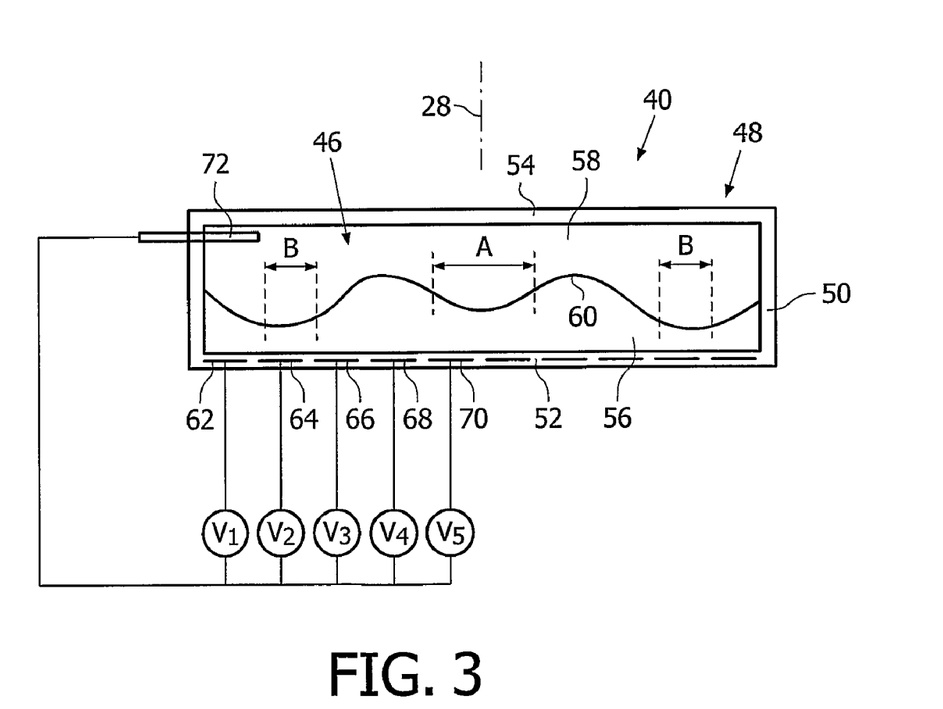
FIG. 3 shows the optical component in FIG. 2 in a second exemplary operating state for introducing optical aberrations.

The electrodes 62-70 are configured as thin plates having their plane arranged perpendicular to the optical axis 28, as shown in FIGS. 2 and 3. The electrodes 62-70 are, further, arranged side by side in substantially one plane perpendicular to the optical axis 28 between the circumferential wall 50.

The single first electrodes 62-70 are controlled by the control system 42 in FIG. 1 via the line or lines 44, accordingly.

FIG. 2 shows the rest state of the optical component 40, when the voltages $V_1$-$V_5$ are zero or have all the same value. In this case the interface 60 between the first fluid 56 and the second fluid 58 is substantially plan or even.

Starting from the operating state shown in FIG. 2 and, for example, applying a voltage $V_5$ which is not zero to the first electrode 70, an electric field is generated which is directed through the first electrically insulating fluid 56 through the interface 60 and acts on the electrically conductive second fluid 58 substantially perpendicular to the interface 60 thereby pulling the second fluid 58 to the first electrode 70 or pushing it away depending on the sign of the voltage $V_5$ in that portion A. The magnitude of the voltage $V_5$ determines the stroke by which the second fluid 58 is pushed away from or pulled towards the first electrode 70.

Further, if, for example, a voltage $V_2$ is applied to the first electrode 64, the second fluid 58 is also pushed away from or pulled towards the first electrode 64 according to the sign of the voltage $V_2$ in the portion B of the interface 60 next to the electrode 64. Thus, by applying respective voltages $V_1$, $V_2$, $V_3$, $V_4$, $V_5$ to the electrode 62, 64, 66, 68, 70, an arbitrary shape of the refracting interface 60 can be obtained, and, thereby, the desired shape of the interface 60 suitable for introducing the desired optical aberration into the light beam 20' or 20" can be adjusted.

The pushing or pulling effect is rendered possible by the fact that the first electrodes 62-70 are arranged in an intermediate portion of the fluid chamber 46 between the circumferential wall 50.

FIG. 3 shows an arbitrary shape of the interface 60, which has been adjusted by an appropriate choice of the voltages $V_1$-$V_5$.

Figure 4:
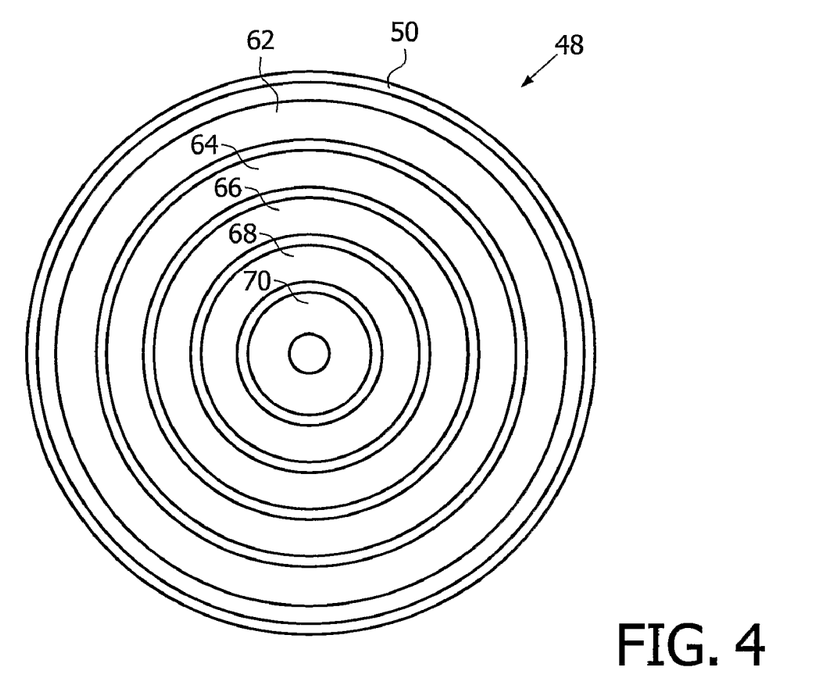
FIG. 4 is a view of the optical component in FIGS. 2 and 3 in a cross-section along line IV-IV in FIG. 2.

In the embodiment shown in FIGS. 2 through 4, any shape of the interface 60 which is formed by corresponding voltages $V_1$-$V_5$ is rotational symmetric with respect to the optical axis 28, because the electrodes 62-70 are configured as rings which are arranged concentrically with respect to the optical axis 28.

However, it could be envisaged to provide other numbers, shapes and/or sizes of first electrodes in order to be able to adjust any desired shape of the interface 60, which also includes rotationally asymmetric shapes with respect to the optical axis 28.

For example, in order to increase the number of electrodes in the embodiment of FIGS. 2 through 4, the electrodes 62-70 could be designed as half rings by interrupting the rings of the electrodes 62-70 along a straight line, thus increasing the number of electrodes from five to ten. In this case, the ten resulting electrodes can have a voltage supply of their own, thus having the opportunity to apply ten different voltages to the ten electrodes, by which a rotational asymmetric shape of the interface 60 can be achieved.

Figure 5:
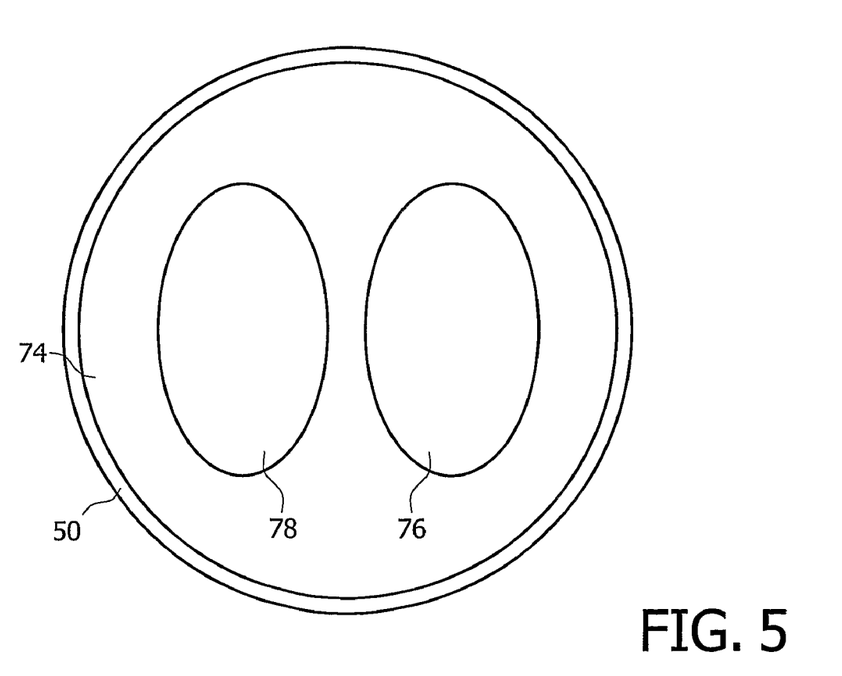
FIG. 5 is a view of another embodiment of an optical component for introducing optical aberrations to a light beam in a cross-section along line V-V in FIG. 6.
Figure 6:
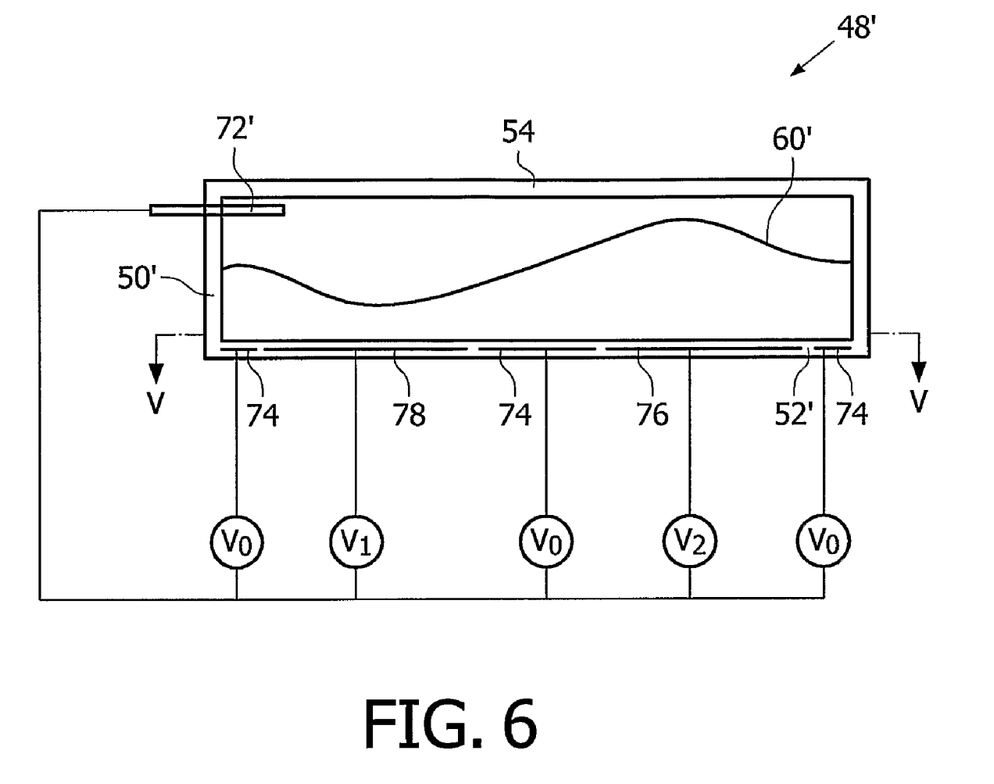
FIG. 6 is a cross-sectional view of the optical component in FIG. 5 in an exemplary operating state.

Another embodiment of the optical component 48' is shown in FIGS. 5 and 6, which differs from the optical component 48 in FIGS. 2 through 4 only by the configuration of the first electrodes so that the optical component 48' is only described with respect to the first electrodes. Elements shown in FIGS. 5 and 6 which are equal or similar elements shown in FIGS. 2-4 are referenced by the same numerals supplemented with a prime.

The optical component 48' comprises three first electrodes 74, 76, 78.

The first electrodes 76 and 78 are configured substantially in oval or elliptical shape, which are arranged parallel and which are spaced from one another.

The first electrode 74 encompasses the first electrodes 76 and 78 and is electrically insulated from the electrodes 76 and 78. The electrode 74 fills the remaining space in the bottom wall 52'.

When applying a voltage $V_0=0$ to the electrode 74, a voltage $V_1=V$ to the electrode 78, and a voltage $V_2=-V$ to the electrode 76, the interface 60' takes the shape as shown in FIG. 6, thus, when the light beam 20' passes through the optical component 48', introducing a cometic wave front into the light beam 20'.

Other embodiments and modifications of the embodiments described above will be apparent to those skilled in the art, in particular other numbers, shapes and/or sizes of the first electrodes can be used in dependence on the optical aberrations to be introduced into the light beam for compensating for the corresponding optical aberrations in the scanning device 10.

The invention claimed is:

1. An optical component for introducing optical aberrations to a light beam (20', 22") defining an optical axis (28), comprising:

a fluid chamber (46) having a first fluid (56) and at least a second fluid (58) therein, the first and second fluids (56, 58) being non-miscible, the first fluid (56) and the second fluid (58) being in contact along an interface (60) extending through the fluid chamber (46) substantially transverse to the optical axis (28), the first and second fluids (56, 58) having different indices of refraction, the first fluid (56) being substantially electrically insulating and the second fluid (58) being substantially electrically conductive;

at least a first electrode (62-70; 74-78) separated from the second fluid (58) and at least a second electrode (72) acting on the second fluid to alter the shape of the interface (60) in dependence on a voltage applied between the first and second electrode (62-70, 72);

characterized in that the at least one first electrode is arranged in an intermediate portion with respect to the interface (60) such that the intermediate portion (A, B) of the interface (60) is moved substantially in direction of the optical axis (28) in dependence on the voltage applied between the at least one first electrode (62-70; 74-78) and the at least one second electrode (72); and the at least one first electrode (62-70; 74-78) is arranged in a wall (52) of the fluid chamber (46) transverse to the optical axis (28).

2. An optical component for introducing optical aberrations to a light beam (20', 22") defining an optical axis (28), comprising:

a fluid chamber (46) having a first fluid (56) and at least a second fluid (58) therein, the first and second fluids (56, 58) being non-miscible, the first fluid (56) and the second fluid (58) being in contact along an interface (60) extending through the fluid chamber (46) substantially transverse to the optical axis (28), the first and second fluids (56, 58) having different indices of refraction, the first fluid (56) being substantially electrically insulating and the second fluid (58) being substantially electrically conductive;

at least a first electrode (62-70; 74-78) separated from the second fluid (58) and at least a second electrode (72) acting on the second fluid to alter the shape of the interface (60) in dependence on a voltage applied between the first and second electrode (62-70, 72);

characterized in that the at least one first electrode is arranged in an intermediate portion with respect to the interface (60) such that the intermediate portion (A, B) of the interface (60) is moved substantially in direction of the optical axis (28) in dependence on the voltage applied between the at least one first electrode (62-70; 74-78) and the at least one second electrode (72);

a plurality of first electrodes (62-70; 74-78) electrically insulated from one another are arranged side by side in substantially one plane perpendicular to the optical axis (28).

3. The optical component of claim 2, characterized in that the first electrodes (62-70; 74-78) are separately connected to a voltage supply such that different voltages can be applied between the at least one second electrode (72) and one of the first electrodes (62-70; 74-78).

4. The optical component of claim 2, characterized in that the first electrodes (62-70; 74-78) differ from one another in size and/or shape.

5. The optical component of claim 2, characterized in that the first electrodes (62-70) are configured as rings arranged concentrical with respect to the optical axis (28).

6. The optical component of claim 2, characterized in that the plurality of first electrodes (74-78) comprises at least three first electrodes (74-78), two first electrodes (76, 78) of which are configured in elliptical or oval shape, which are arranged parallel to and in a distance from one another, and which are encompassed by a third first electrode (74) which fills the remaining portion between the two first electrodes (76, 78).

7. An optical component for introducing optical aberrations to a light beam (20', 22") defining an optical axis (28), comprising:

a fluid chamber (46) having a first fluid (56) and at least a second fluid (58) therein, the first and second fluids (56, 58) being non-miscible, the first fluid (56) and the second fluid (58) being in contact along an interface (60)

extending through the fluid chamber (46) substantially transverse to the optical axis (28), the first and second fluids (56, 58) having different indices of refraction, the first fluid (56) being substantially electrically insulating and the second fluid (58) being substantially electrically conductive;

at least a first electrode (62-70; 74-78) separated from the second fluid (58) and at least a second electrode (72) acting on the second fluid to alter the shape of the interface (60) in dependence on a voltage applied between the first and second electrode (62-70, 72);

characterized in that the at least one first electrode is arranged in an intermediate portion with respect to the interface (60) such that the intermediate portion (A, B) of the interface (60) is moved substantially in direction of the optical axis (28) in dependence on the voltage applied between the at least one first electrode (62-70; 74-78) and the at least one second electrode (72);

the at least one electrode (62-70) is configured in ring shape.

* * * * *